UNITED STATES PATENT OFFICE 2,354,132

THERAPEUTIC PRODUCT AND PROCESS FOR THE MANUFACTURE OF THE SAME

John Lee, Nutley, and Ulrich V. Solmssen, Clifton, N. J., assignors to Hoffmann-La Roche, Incorporated, Nutley, N. J., a corporation of New Jersey No Drawing. Application June 26, 1940,
Serial No. 342,566

4 Claims. (Cl. 260—457)

This invention relates to stable, sterilizable solutions of salts of diesters of 2-methyl-1,4-naphthohydroquinones of the structure

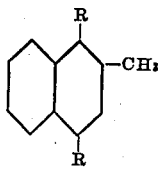

where R is a radical selected from the class consisting of

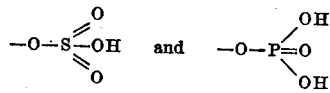

suitable for therapeutic use. The salts of disulfuric and diphosphoric acid esters of 2-methyl-1,4-naphthohydroquinone, as described by Fieser and Fry, J. Am. Chem. Soc. 62, 228 (1940) and Foster, Lee and Solmssen, J. Am. Chem. Soc. 62, 453 (1940), and in our copending application, S. N. 313,300, have been shown to have high anti-hemorrhagic activity when tested against vitamin K-depleted chickens, and have been successfully applied in clinical cases. In particular the tetrasodium salt of 2-methyl-1,4-naphthohydroquinone diphosphoric ester has been found of great therapeutic value. Single injections of 10 mg. of the substance are often sufficient to raise the prothrombin level of the blood from dangerously low levels to normal. One to three injections of 10 mg. of the substance have been shown sufficient to enable operations to be performed which, without this type of therapy, could not have been undertaken. Aqueous solutions of these materials, when compared with aqueous solutions of the salts of dibasic organic acid esters of 2-methyl-1,4-naphthohydroquinone, are comparatively stable, but we have found that they have certain defects. On standing such solutions tend to discolor and ultimately to deposit solid materials. There is little loss of biological activity but the preparations are not suitable in this condition for injection purposes.

We have found after extensive analytical investigation of this condition that it is due to hydrolysis of the ester with subsequent oxidation of the liberated hydroquinone. We have found that in the presence of daylight, especially sunlight, when oxygen and air are passed through solutions of the above-named ester which are contained in colorless vessels, or even when the surface of the liquid is exposed to air, the hydrolysis and oxidation is much accelerated. We have also found that if light of wave lengths from 375 m$\mu$ to 500 m$\mu$ is excluded, hydrolysis is very greatly retarded, and under these conditions if a non-oxidizing gas is passed through the solution, only after long periods do the discoloration and precipitation occur.

The hydrolysis of the solutions on exposure to light of the wave lengths between 375 and 500 m$\mu$ can in the case of the diphosphoric acid esters further be established by the determination of free phosphoric ions formed. This can be done by the method of K. Lohmann and L. Jendrassik, Biochem. Ztschr. 178, 419 (1926) when it is shown that with progressive irradiation of the solution with daylight or with light of the above band, increasing amounts of free phosphoric ions are formed.

In thus establishing by experiment the causes of the decomposition of these solutions, namely hydrolysis and oxidation, we have discovered that the deleterious reactions can be inhibited by packaging the solutions of the esters in containers capable of absorbing light and wave lengths from 375 m$\mu$ to 500 m$\mu$ under an oxygen-free atmosphere. Such containers can be the normal brown glass ampuls or bottles of commerce, and such an atmosphere is suitably carbon dioxide or nitrogen.

In actual pharmaceutical practice, it is difficult to obtain a closed container such as an ampul containing an aqueous solution absolutely free of oxygen, and we have found in actual practice that it is preferable to introduce into the aqueous solution a non-toxic concentration of a substance of the class of inorganic sulfur-containing reducing agents. Such substances are the alkali metal, alkaline earth, ammonium and substituted ammonium salts of acids capable of giving rise to sulfur dioxide, as for example pyrosulphurous acid, sulphurous acid, hyposulphurous acid, convenient salts being sodium, potassium or ammonium metabisulfite, sodium sulfite and sodium hyposulfite.

If a sufficient amount of these agents be added to the solution in the container containing only a small volume of air, the replacement of the latter with a non-oxidizing atmosphere is not necessary. 2 cc. of the stabilized solution prepared according to Example 1 and packaged in the normal, commercial 2 cc. ampul, can be sterilized at 100° C. for several hours and subsequently stored at room temperature indefinitely without undergoing any change.

The concentration of the agents to be added to the solution of the esters can vary from 0.01–0.1% or more. Higher concentrations of materials can be employed but it is usually not necessary. The addition of these reagents appears not only to have an anti-oxidative action, but also inhibits hydrolysis due to light. Moreover, it is found that in the presence of these agents if hydrolysis of the esters is forced by varying the external conditions the discoloration of the solutions and deposition of solid materials is nevertheless considerably inhibited.

Our full invention therefore comprises the preparation of stable, aqueous solutions of salts of diphosphoric or disulfuric acid esters of 2-methyl-1,4-naphthohydroquinone, which comprises packaging the material under substantially non-hydrolyzing and non-oxidizing conditions, with or without the presence of a chemical stabilizing agent.

The following examples illustrate the invention without limiting it thereto:

Example 1

10 g. of tetrasodium salt of 2-methyl-1,4-naphthohydroquinone, 1.0 g. of sodium metabisulfite and 4 g. of sodium chloride are dissolved in enough distilled water to produce one liter of solution. The pH is adjusted with sodium hydroxide solution to 7. The solution is filtered, packaged in 1 or 2 cc. glass ampuls capable of absorbing substantially all of the wave lengths between 350 and 550 mμ, and sterilized by heating at 100° C. for ½ hour on each of three successive days.

Example 2

A solution is prepared as in Example 1 and packaged in ampuls under nitrogen and sterilized.

Example 3

A solution is prepared as in Example 1 and 0.1% p-hydroxy benzoic acid methyl ester added. The solution is filtered through a Berkfeld filter and packaged in glass ampuls or glass, rubber-capped closed containers capable of high absorption in the wave length band 350–500 mμ.

Example 4

10 g. of tetrasodium salt of 2-methyl-1,4-naphthohydroquinone diphosphoric acid ester and 5 g. of sodium hyposulfite are dissolved in 1 liter of water and packaged as in Example 1.

Example 5

As in Example 1 except that instead of 1 g. sodium metabisulfite, 1 g. potassium metabisulfite is used.

Example 6

10 g. of the tetrasodium salt of 2-methyl-1,4-naphthohydroquinone diphosphoric acid ester, and 5 g. of sodium sulfite are dissolved in 1000 cc. of water, filtered and packaged in 1 cc. brown glass ampuls.

Example 7

10 g. of the dicalcium salt of 2-methyl-1,4-naphthohydroquinone diphosphoric acid ester and 1 g. of sodium metabisulfite are dissolved in 1 liter of water and packaged as in Example 1.

Example 8

10 g. of the di-(ethylene diamine) salt of 2-methyl-1,4-naphthohydroquinone diphosphoric acid ester, 1 g. of sodium metabisulfite, and enough sodium chloride to form an isotonic solution are dissolved in 1 liter of water, filtered, packaged in ampuls and sterilized.

Example 9

10 g. of tetra monoethanolamine salt of 2-methyl-1,4-naphthohydroquinone diphosphoric acid ester, 1 g. of sodium metabisulfite are dissolved in 1 liter of water and packaged under nitrogen in glass ampuls capable of substantial absorption of light in the wave length band 350–550 mμ.

Example 10

10 g. of disodium salt of 2-methyl-1,4-naphthohydroquinone disulfuric acid ester and 1 g. of sodium metabisulfite are dissolved in 1 liter of water, the solution adjusted to isotonicity with sodium chloride, packaged in glass ampuls capable of absorption of light in the wave length band 350–550 mμ.

We claim:

1. A package comprising a glass container containing a solution of a salt of the structure

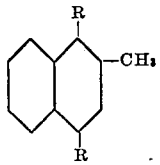

wherein R is a radical selected from the group consisting of

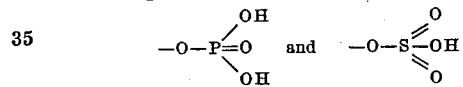

stabilized by the addition of sodium metabisulfite.

2. A package comprising a glass container containing a solution of a salt of the structure

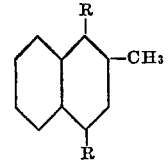

where R is a radical selected from the group consisting of

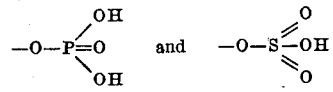

stabilized by the addition of sodium sulphite.

3. A package comprising a glass container containing a solution of the salt of the structure:

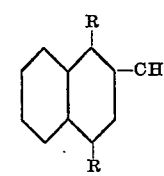

wherein R is a radical selected from the group consisting of

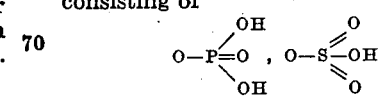

and stabilized by the addition of a salt of a quadrivalent sulfur-containing acid capable of yielding $SO_2$ with HCl.

4. A package comprising a glass container containing a solution of a salt of the structure
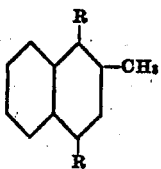
where R is a radical selected from the group consisting of
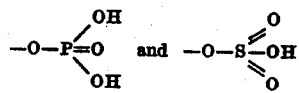
stabilized by the addition of sodium hyposulphite.
JOHN LEE.
ULRICH V. SOLMSSEN.